(12) United States Patent
Hu et al.

(10) Patent No.: US 11,303,625 B2
(45) Date of Patent: Apr. 12, 2022

(54) INDUSTRIAL AUTOMATION DEVICE AND CLOUD SERVICE

(71) Applicant: ABB Schweiz AG, Baden (CH)

(72) Inventors: Zhongliang Hu, Espoo (FI); Toni Kuikka, Helsinki (FI); Mikko Kohvakka, Espoo (FI)

(73) Assignee: ABB Schweiz AG, Baden (CH)

( * ) Notice: Subject to any disclaimer, the term of this patent is extended or adjusted under 35 U.S.C. 154(b) by 352 days.

(21) Appl. No.: 16/244,749

(22) Filed: Jan. 10, 2019

(65) Prior Publication Data

US 2019/0215319 A1    Jul. 11, 2019

(51) Int. Cl.
*H04L 29/06* (2006.01)
*G05B 19/418* (2006.01)
(Continued)

(52) U.S. Cl.
CPC ...... *H04L 63/0807* (2013.01); *G05B 19/4185* (2013.01); *G06F 21/30* (2013.01);
(Continued)

(58) Field of Classification Search
CPC ....... H04L 63/0807; H04L 9/32; H04L 63/08; H04L 9/3213; H04L 63/0853;
(Continued)

(56) References Cited

U.S. PATENT DOCUMENTS 10,382,203 B1 *  8/2019  Loladia ............... H04L 9/30
2015/0222621 A1  8/2015  Baum et al.
(Continued)

FOREIGN PATENT DOCUMENTS

CN    104346759 A    2/2015
CN    104821050 A    8/2015
(Continued)

OTHER PUBLICATIONS

Finnish Patent Office, Search Report issued in corresponding Application No. 20185028, dated Apr. 16, 2018, 2 pp.
(Continued)

*Primary Examiner* — Brandon S Hoffman
*Assistant Examiner* — Nega Woldemariam
(74) *Attorney, Agent, or Firm* — Leydig, Voit & Mayer, Ltd.

(57) ABSTRACT

An industrial automation device with a token to be used as authentication information in information exchange between a first cloud service and the industrial automation device, a mobile device is connected to the industrial automation device and to a cloud service that is the first cloud service or a second cloud service. After authenticating the user of the mobile device to the cloud service, a token is generated by the cloud service to the first cloud service, and forwarded via the mobile device to the industrial automation device. If the cloud service that generated the token is the second cloud service, the token is forwarded via the mobile device, after the mobile has been authenticated in the first cloud service, the first cloud service. Thereafter the industrial automation device and the first cloud service may communicate directly with each other using the token for authentication.

6 Claims, 4 Drawing Sheets

(51) Int. Cl.
  *H04L 9/32* (2006.01)
  *G06F 21/30* (2013.01)
  *H04W 12/06* (2021.01)

(52) U.S. Cl.
  CPC .............. *H04L 9/32* (2013.01); *H04L 9/3213* (2013.01); *H04L 63/08* (2013.01); *H04L 63/0853* (2013.01); *H04W 12/06* (2013.01)

(58) Field of Classification Search
  CPC ......... H04L 67/10; H04L 67/12; G06F 21/30; H04W 12/06; G05B 19/4185
  USPC ............................................................ 726/9
  See application file for complete search history.

(56) References Cited

U.S. PATENT DOCUMENTS

| | | | |
|---|---|---|---|
| 2015/0249659 A1* | 9/2015 | Vongsouvanh | ....... H04W 12/06 726/5 |
| 2016/0182499 A1 | 6/2016 | Sharga et al. | |
| 2017/0192414 A1 | 7/2017 | Mukkamala et al. | |
| 2017/0223057 A1 | 8/2017 | Amiri | |
| 2018/0006821 A1 | 1/2018 | Kinagi | |

FOREIGN PATENT DOCUMENTS

| | | |
|---|---|---|
| CN | 104992344 A | 10/2015 |
| EP | 2924569 A2 | 9/2015 |
| WO | 2016148773 A1 | 9/2016 |

OTHER PUBLICATIONS

Stout et al., "Challenges to Securing the Internet of Things," IEEE International Carnahan Conference on Security Technology (ICCST), Oct. 2016, pp. 1-8.

European Patent Office, Extended Search Report issued in corresponding Application No. 19150915.7, dated Apr. 8, 2019, 8 pp.

Chinese National Intellectual Property Administration, Office Action in Counterpart Chinese Patent Application No. 20191001603935, 23 pp. (dated Jul. 13, 2021).

* cited by examiner

INDUSTRIAL AUTOMATION DEVICE AND CLOUD SERVICE

RELATED APPLICATIONS

This application claims priority to Finnish patent application no. 20185028, filed on Jan. 10, 2018, the contents of which is hereby incorporated herein by reference in its entirety.

FIELD

The present invention relates to industrial automation devices and cloud services.

BACKGROUND ART

The evolvement of networking between computers and computing devices capable to communicate over the Internet without user involvement, has enabled different services. One example of such services is remote monitoring of industrial automation devices by secure cloud services. To connect an industrial automation device, usually with limited user-interaction capabilities, to a secure cloud service that requires some kind of authentication, is challenging.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, a non-transitory computer readable medium, an apparatus and a system for providing an industrial automation device with information with which to securely exchange information with a cloud.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system that comprises one or more industrial sites comprising one or more industrial automation devices, clouds configured to provide remote services to one or more of the industrial automation devices, directly and/or via remote mobile devices, or via any corresponding device that can locate or locates in an industrial site.

Figure 1:
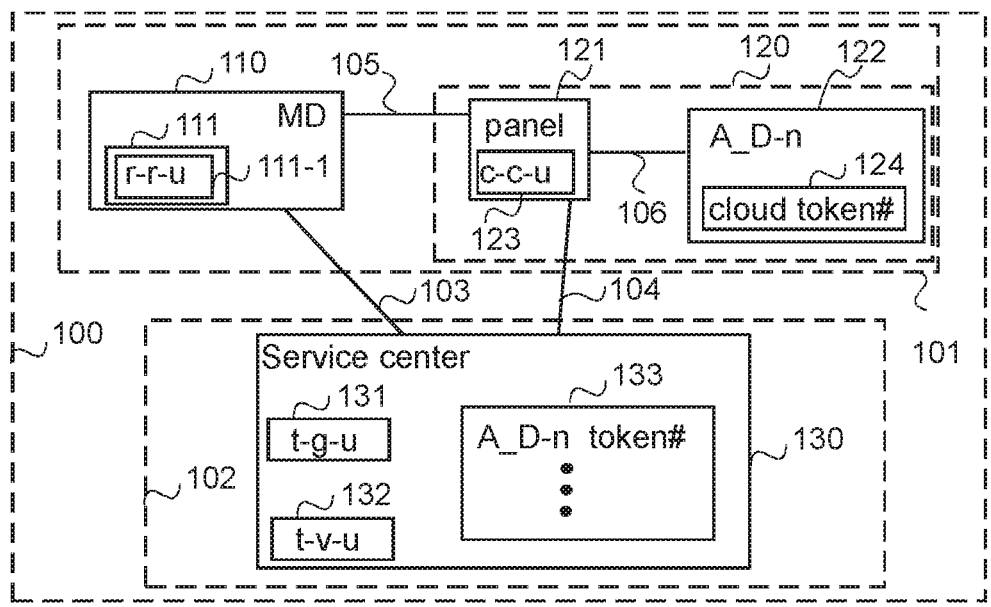
FIG. 1 shows a simplified a system with a block diagram of an exemplified device.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, other functions and structures that are not illustrated.

In the embodiment illustrated in FIG. 1, the system 100 comprises one or more industrial sites 101 (only one illustrated in FIG. 1) connected over one or more networks (none shown in FIG. 1) to one or more clouds 102 (only one illustrated in FIG. 1).

In the illustrated example of FIG. 1, in the industrial site 101 there is a mobile device 110 of a remote user and one or more industrial automation devices 120 (only one illustrated in the example).

The mobile device (MD) 110 refers to a computing device (equipment), that is a portable device, and it may also be referred to as a mobile terminal, user apparatus, user terminal or user device. Portable computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device, wearable computer and other types of wearable devices, such as clothing and accessories incorporating computer and advanced electronic technologies. The mobile device 110 is configured to support remote maintenance, or at least commissioning (starting up) and configuring (tuning) of industrial automation devices. For that purpose, the mobile device 110 comprises a remote support application provided by a remote tool unit 111, and its sub-unit remote registering unit (r-r-u) 111-1 whose functionality will be described in more detail below with FIGS. 2, 7 and 8. Naturally the sub-unit functionality may be integrated to the remote tool unit functionality.

In the illustrated example of FIG. 1, an industrial automation device 120 comprises as separate components a panel 121 and an automation device 122.

The panel 121 provides one or more interfaces to and from the automation device 122. The panel 121 refers herein to equipment via which parameters of the automation device 122 may be adjusted or acquired, and the functions of the automation device 122 otherwise controlled by a person locating on the site and/or remotely from the cloud 102 (and/or from a separate service center). In other words, the panel is a module providing at least a wireless interface to which the mobile device may connect to, and an interface, wireless or wired, with which to connect to the cloud 102. The panel 121 may be a separate device (as in the illustrated example), or a device detachable connectable to the automation device, or equipment integrated to the automation device. At the simplest the panel may be the mere interfaces. Other examples of the panel include a control panel, smart-phone, mobile phone, tablet or laptop computer. At least in the solutions in which the panel 121 is not integrated with the automation device 122, the panel 121 may be located on-site at a close proximity of the automation device 122 to which a connection 106 may be provided via a communication interface by Bluetooth, NFC, WiFi and/or inductive connection (such as an inductive connection according to an inductive power standard (Qi) by the Wireless Power Consortium), for example. However, for a secure connection to the cloud 102, the connection 106 is preferably a wired connection.

The automation device 122 (A_D-n) is a device controlling an industrial process, device, or equipment, according to its settings. However, the details of the controlling functionality of the automation device bear no significance and are therefore not described in detail herein. Further, it should be appreciated that the industrial automation device 120, comprising the panel 121 and the automation device 122, depicts herein any device, machine, equipment, system and a process whose operations and/or service and/or maintenance may be taken care remotely. Examples of such industrial automation devices include drivers, frequency converters, AC/DC modules, DC/AC modules, programmable logic controllers, switches, motion controllers or motion drives, servo motors, soft starters, and heavy equipment, etc. It should be appreciated that in the above only some examples are listed.

In the illustrated example the industrial automation device is configured to establish a secure connection 104 to the secure cloud 102. For that purpose the panel 121 comprises a cloud connection unit (c-c-u) 123 and the automation device comprises in a secure memory 124 at least one token for a specific cloud, identified by its address. The secure memory 124 may comprise one or more token-cloud address pairs, for example one token for one cloud, or for one cloud service, and a token-cloud may be associated with information that may contain definitions describing for what the token can be used. For example, a token may allow sending information from the industrial automation device, another token allow receiving information, still a further token allows both, a token allows both and in addition allows setting up parameters of the industrial automation device, just to list couple of examples. Naturally the cloud connection unit 123 may locate in the automation device and/or the secure memory 124 may locate at the panel side. Further, there are several ways how to provide the secure memory and any of them may be used.

Connections 103, 104 from the mobile device and the industrial automation device, correspondingly, to the one or more clouds 102 may be same kind of connections, or different connections. The connections 103, 104, or one of them may be a wired connection, a wireless connection, or any combination thereof. The wireless connection to the cloud 102 may be provided by any mobile system, such as GSM, GPRS, LTE, 4G, 5G and beyond, or a combination of a mobile system and a fixed system, like Wi-Fi or Li-Fi providing access to internet and via internet to the service center. The local connection 105 between the mobile device 110 and the industrial automation device 120, or actually to the panel 121, may be provided naturally over a mobile system but it may be provided by a local connection, such as a direct connection, for example using Bluetooth, or a cable, such as an USB cable, or by a local network, like Wi-Fi or Li-Fi.

In the illustrated example the secure cloud 102 comprises a service center 130. The service center 130 may be any combination of any user interface, like touch screen or combination of a display and a keypad, and any computing apparatus, or a cloud of computing apparatuses appearing as one computing apparatus, that provides remote support via remote support applications in mobile devices. Examples of such apparatuses include a work station, a laptop computer, a personal computer, and a display with a (cloud) server that may be cloud server. The service center 130 is configured to support secure connections to industrial automation devices. For that purpose the service center 130 comprises a token generation unit (t-g-u) 131 and a token verification unit (t-v-u) 132, whose functionality will be described in more detail below, and in a data storage (memory) 133 valid tokens, each associated in the illustrated example with information on the automation device to which the token has been generated. It should be appreciated that there may be service centers comprising only the token verification unit, and in the memory token information. The stored token information may be the mere token, or the token information may comprise in addition to the token, also one or more of the following: address of the industrial automation device, other identification of the industrial automation device, validity time of the token, access restrictions, time when the token has been generated, just to list few examples. It should be appreciated that any necessary information, like a seed/random number to update the token value may be stored in the token information.

The data storage may be any kind of conventional or future data repository, including distributed and centralized storing of data, a cloud-based storage in a cloud environment, managed by any suitable management system (not disclosed separately in FIG. 1). The implementation of the data storage, the manner how data is stored, retrieved and updated are irrelevant to the invention, and therefore not described in detail here.

The cloud 102 may be a global cloud, an enterprise level cloud, a factory level cloud, for example.

Although in the above example it is assumed that secure cloud and secure memory are used, it should be appreciated that non-secure cloud and/or non-secure memory may be used as well, if security risks are not an issue.

Figure 2:
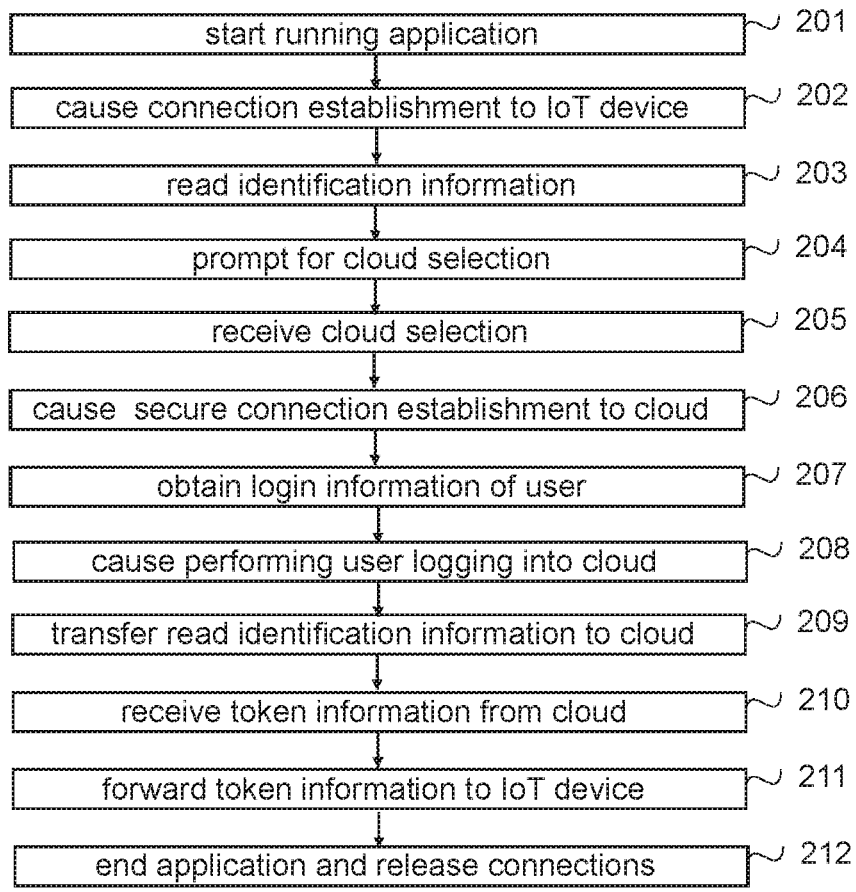
FIGS. 2 to 6 are flow charts illustrating different functionalities.

FIG. 2 illustrates an example functionality of the mobile device, or more precisely, the remote registering unit (or the remote support unit). In the FIG. 2 an Industrial Internet of Things (IoT) device is used as an example of the industrial automation device, and that the application is started only to register the IoT device to a cloud. Naturally the application provided by the remote registering unit can be used for setting other parameters, etc., and for (with) any kind of industrial automation device. Further, it is assumed that the mobile device locates in the industrial site so that it can establish a connection to the IoT device.

Referring to FIG. 2, in response to a corresponding user input, running of the remote support application, or at least registering application, is started in step 201, and a connection establishment is caused in step 202, without user involvement, from the mobile device to the IoT device. Then the mobile device reads in step 203 identification information from the IoT device to register the IoT device to the cloud. The identification information may, for example, be an automation device serial number, a communication address allocated to the IoT device, or their combination. Depending on an implementation, other information may be read (retrieved) also for the registration process, such as a hardcoded number to be used as a random number, or a random number generated by the IoT device, connection time of the panel, just to list couple of examples. It should be appreciated that any existing information may be read, depending on what the remote support application is configured to read for the registration process.

The user is also prompted in step 204 to input a cloud selection. For example, a global cloud may be outputted as a default cloud, but the user may input any other cloud, like an enterprise cloud, as the selected cloud. Once the user input indicating the cloud selection is received, establishment of a secure connection to the selected cloud, using, for example, the user inputted address and Diffie-Hellman handshake procedure, is caused in step 206. Then in step 207 user login information to the cloud is obtained in step 207. For example, a username and a password may be obtained. Naturally any other logging information may be used. Further, in the user logging, federated identity management, such as any of single sign-on (SSO) systems that allow a single user authentication process across multiple systems/applications or even enterprises (companies), may be used. Then causing user logging into the cloud service is performed in step 208.

In the illustrated example, it is assumed that the user logging succeeds, and the identification information read from the IoT device is transferred in step 209 to the cloud service, to register the IoT device to the cloud service. Naturally any other information read may also be transferred. As a response, token information is received in step 210 from the cloud service, and forwarding the token information to the IoT device is caused in step 211. The forwarded token information contains in addition to the token, also cloud address information received as the selection. Naturally the token information may contain any other information included in the received token information, but the received token information may be different than the forwarded token information.

Then, in the illustrated example, no further parameters are set, and hence the remote support application is ended (turned off) in step 212 and connections to the IoT device and to the cloud server are released in step 212.

Figure 3:
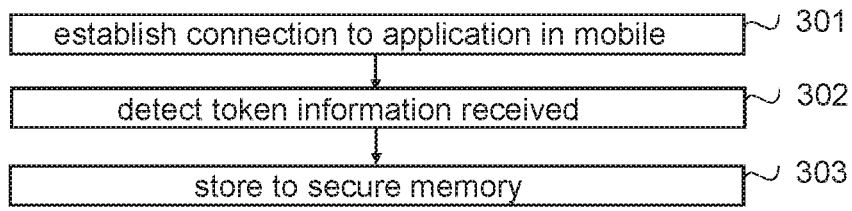
Figure 4:
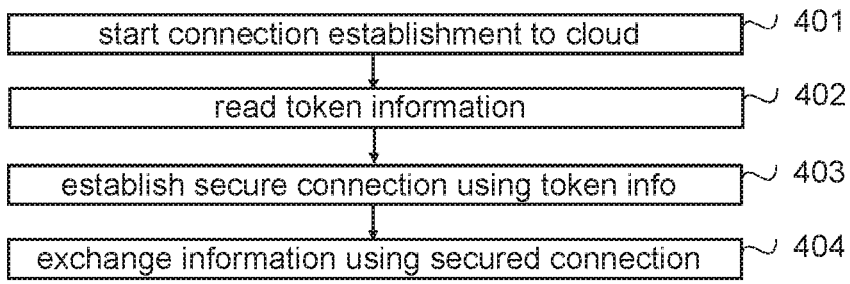

FIGS. 3 and 4 illustrate example functionalities of the industrial automation device. The functionalities may be performed by the cloud connection unit, or any corresponding unit/sub-unit, such as a set-up unit.

Referring to FIG. 3, while a connection to a mobile device, or its set-up tool/remote tool, has been established (step 301), and it is detected in step 302 that token information has been received, the token information is stored in step 303 to the secure memory in the industrial automation device. As said above, the token information comprises at least the token and the cloud address. If the token information contains any other information, that is also naturally stored.

Referring to FIG. 4, a connection establishment to the cloud, i.e. to the cloud service, is started in step 401. The connection establishment may be started because the industrial automation device, as an IoT device, is configured to report some information at certain intervals and/or in response to a certain event to the cloud server, for example. Another example is that a connection establishment request is received from the cloud whose address can be found in the memory. For the connection establishment, token information is read in step 402, and using the token information a secure connection is established in step 403 to the cloud, and information is exchanged in step 404 using the established secure connection.

Although in the illustrated example the token is used as authentication information in other implementations it may be used as a shared secret, as a seed to a shared secret, or if stateless HTTP (Hypertext Transfer Protocol) is used, in HTTP messages. In other words, the token can be used as if it were hardcoded to the industrial automation device. Further, the disclosed way to provide the automatic industrial device with token information provides versatile opportunities to use the token, since updating the token is easier and faster than updating a hardcoded token.

Figure 5:
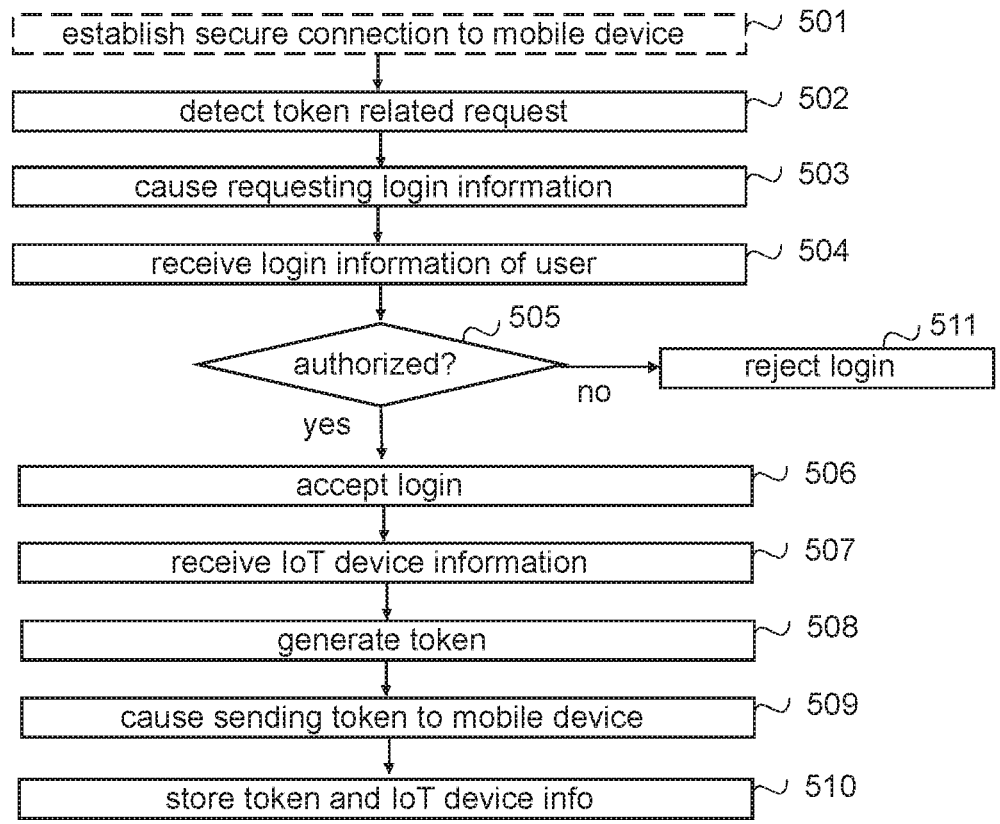
Figure 6:
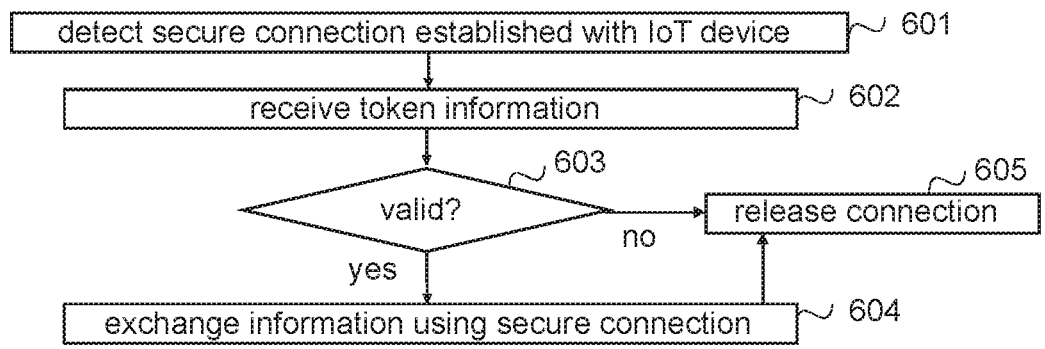

FIGS. 5 and 6 illustrate example functionalities of a cloud, performed by a cloud service center. In the illustrated examples it is assumed that the same cloud performs both functionalities without restricting the disclosed implementations to such a solution. Further, in the examples an Industrial Internet of Things (IoT) device is used as an example of an industrial automation device. It is a straightforward solution to one skilled in the art to implement the solutions to other kind of industrial automation devices.

FIG. 5 illustrates an example of token generation functionality, i.e. functionality performed by the token generation unit, or any corresponding unit. In the example, it is assumed that a secure connection has been established in step 501 to the mobile device, for example using Diffie-Hellman handshake.

When a token related request, such as a request for a token, or request for set up (commission) a new device, for example, is detected in step 502, requesting login information from a user of the mobile device is caused in step 503. For example, a message requesting login information, or a message specifying information needed for token generation, like username and password, may be sent to the mobile device. The login information may be specific for the token generation service, or the same information as used with the remote support application, or within any other specific tool in the remote support application, or with any other application in the mobile device.

When the login information of the user is received in step 504, it is checked in step 505, whether or not the user is an authorized user. In other words, it is checked whether the login information matches to one of login information of authorized users. For example, there may be a list of username-password associations, and if the received username-password combination is in the list, the user is an authorized user.

If the login information is login information of an authorized user (step 505: yes), the login is accepted in step 506. This includes informing the mobile device correspondingly, and allowing token generation.

When IoT device information is received in step 507, a token for the IoT device is generated in step 508. Any known or future ways to generate the token may be used. Sending the generated token to the mobile device is caused in step 509, and the token is also stored in step 510 with corresponding IoT device information. It should be appreciated that it depends on an implementation, what is stored after the token has been generated. It may be that nothing is stored, or the mere token is stored, or further information, like access restrictions or use limitations, just to mention few examples without limiting the solutions to the examples, may be stored. In implementations in which the token has a certain lifetime, an expiry time may be stored with the token as well. Alternatively, storing time of the token may be used to determine whether or not the token has expired.

After that the remote support session using the established secure connection may be continued for other purposes, or the secure connection may be released.

If the received login information is not login information of an authorized user (step 505: no), the login is rejected in step 511, and the process is ended.

As can be seen from the above, the token information is generated only to authorized requesters, and hence the token can be used to authenticate the IoT device.

If the same logging information is used as with the remote support application, and if the user, via the mobile device, already has been logged into the remote support, thereby making the login information already available and ensuring that the token is requested by an authorized user, there is no need to re-request the login information but the process may continue after step 502 directly to step 507, or if the token related request already contained the IoT device information, to step 508 to generate the token.

FIG. 6 illustrates an example of how the generated tokens are utilized in the cloud. More precisely, it illustrates an example of functionality of the token verification unit. In the example it is assumed that information is exchanged over Internet, using Internet protocols, and that a secure connection is an HTTPS connection (HTTPS, Hypertext Transfer Protocol Secure), in which the HTTP data transfer protocol is used with TLS (Transport Layer Security). However, it should be appreciated that any other way to establish a secure connection may be used. Further, the reason why the connection is established, bears no significance. The connection establishment may have been triggered by the IoT device requesting a connection establishment. For example, the IoT device may have been configured to send certain data to the cloud at certain time intervals and/or in response to a certain event being detected. Another example is that the cloud service is configured to acquire data from the IoT device at certain time intervals and/or in response to a certain event being detected and/or in response to a user input requesting a connection establishment to acquire data.

Referring to FIG. 6, it is detected in step 601 that a secure connection with an IoT device has been established, and token information, or at least a token, is received in step 602.

Using the token information stored in the cloud, it is checked in step 603, whether or not the token is a valid one. If the token is valid (step 603: yes), information is exchanged in step 604 using the secure connection. When there is not any more information to exchange, the secure connection is released in step 605.

If the token is not valid (step 603: no), the secure connection is released in step 605.

Figure 7:
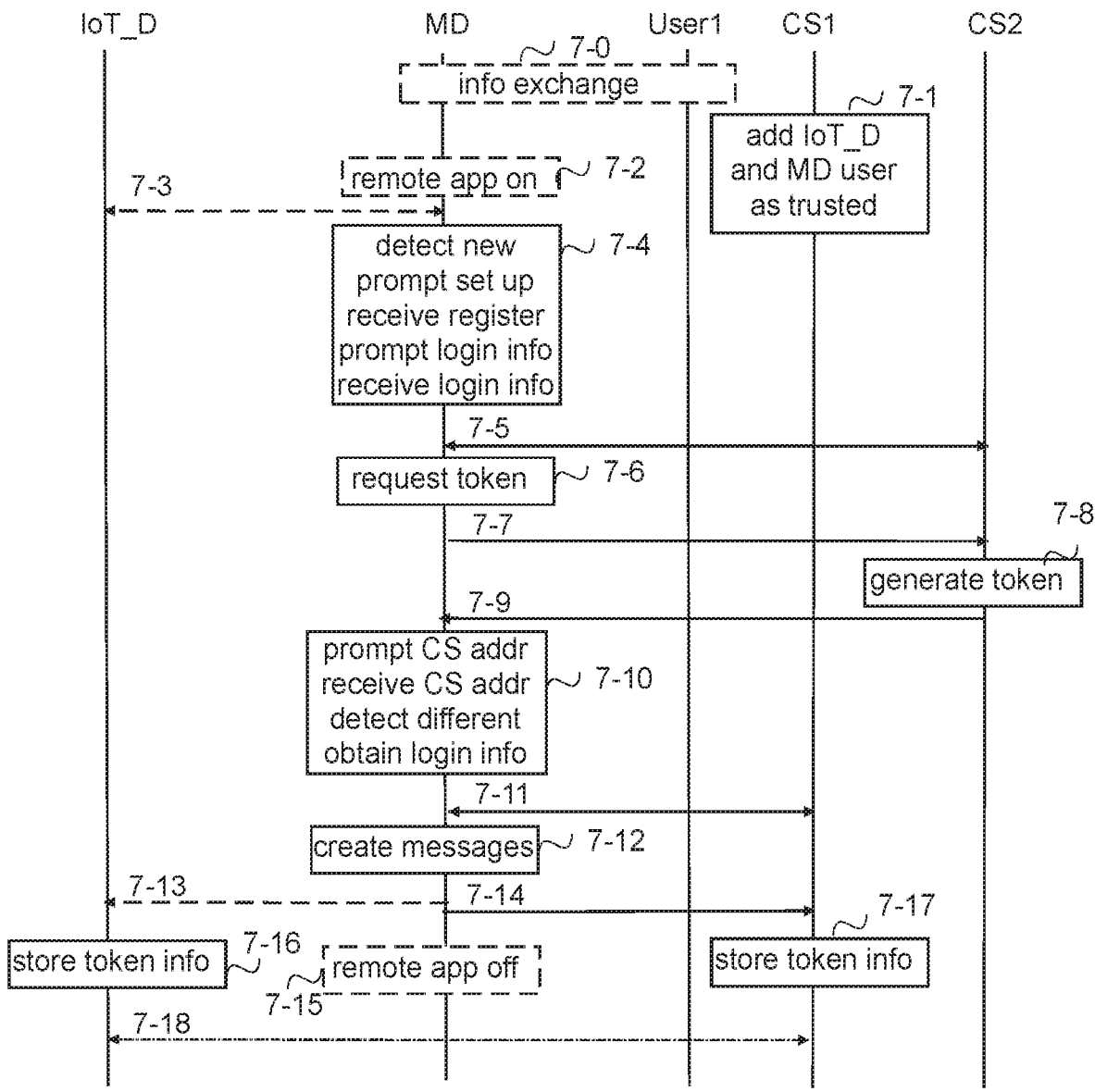
FIGS. 7 and 8 illustrate exemplified information exchange.
Figure 8:
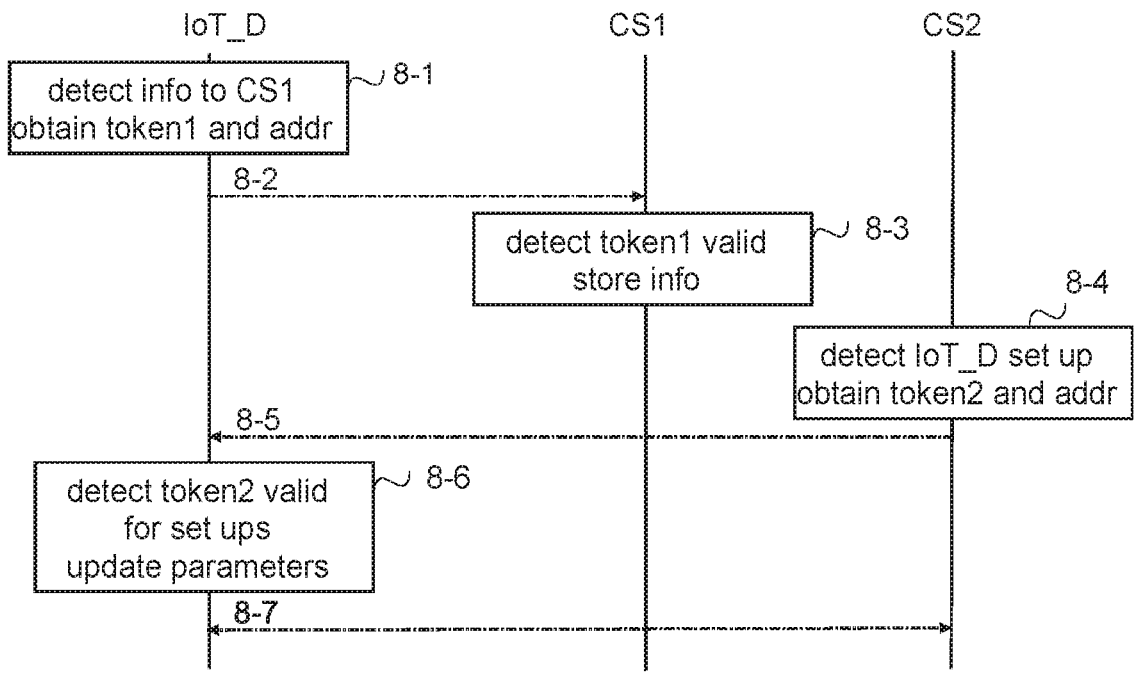

FIGS. 7 and 8 illustrate examples of information exchange. In the examples an Industrial Internet of Things (IoT) device is used as an example of an industrial automation device. It is a straightforward solution to one skilled in the art to implement the solutions to other kind of industrial automation devices. Further, in the examples it is assumed that the industrial automation device is installed in an industrial site of company ABC having cloud service CS1, the industrial automation device being manufactured by company XYZ having cloud service CS2.

In the example illustrated in FIG. 7 it is further assumed that a person working for company XYZ is in the site to install and set up (commission) the IoT device (IoT_D), using a mobile device MD that comprises a remote support application, or at least remote registering application, i.e. functionality provided by the remote registering unit. However, below the remote support application is used to cover both possibilities. An industrial automation device may be appear as a new one, for example, because of a change of a panel. Also an expiry of a validity period of a token, for example, may cause the industrial automation device to appear as a new one. Naturally the industrial automation device may be a new one. A further assumption in the example of FIG. 8 is that the token generation unit is provided by the cloud service of company XYZ only, but cloud service of company ABC, for example a token verification unit in the cloud service of company ABC, allows storing of token information via a mobile device that has been authenticated.

Referring to FIG. 7, information is exchanged in point 7-0 between the user of MD, i.e. the person that is in the site installing and setting up (commissioning) the IoT device, and a used who is working for company ABC. The information may be exchanged orally, by paper, and/or by mobile devices. The information preferably comprises at least address for the cloud service CS1, and information with which the user of MD can be added in point 7-1 as a trusted user and the IoT_D can be added in point 7-1 as a trusted device to CS1, to enable use of federated identity management for the user of MD, and to enable commissioning of IoT_D to CS1.

Then, in the illustrated example, the user turns, in point 7-2, the remote support application, or at least remote registering, on, and MD connects to IoT_D and thereby also receives identification information of IoT_D (messages 7-3). (If the user of MD does not have the information required in point 7-1, it may be outputted, or forwarded using any other means at this point, for example.) The remote support application in MD detects in point 7-4 that IoT_D is a new device, and therefore prompts in point 7-4 the user that a set up/registration is needed. In the illustrated example it is assumed that user input accepting the set up, such as "register IoT_D) is received in point 7-4. Then the user is prompted in point 7-4 to provide login information for CS2. Once the login information, i.e. credentials, such as a user name and password has been received in point 7-4, a user logging is performed by messages 7-5 to CS2. In other words, a connection is established and user authenticated.

In the illustrated example it is assumed that the authentication (or login) succeeds, and therefore MD creates, in point 7-6, a request for a token for IoT_D. The request may be a request to register IoT_D. The request may include at least identification information of IoT_D. The request is sent in message 7-7 to CS2. Message 7-7 triggers token generation, or initial registering, in CS2, which, or its token generation unit, generates in point 7-8 a token. However, in the illustrated example the token is not yet stored but the token, and possible other information, like a validity time, is sent to MD in message 7-9.

In response to receiving the token information in message 7-9, MD prompts in point 7-10 for a cloud service address. For example, MD may output "Use default CS address, yes/no, input here the address to be used", wherein the default CS address would a cloud service address in a cloud of company XYZ. In the illustrated example, the address in CS1, i.e, in a cloud of company ABC, is to be used, and it is received in point 7-10. In the example, it is detected therefore in point 7-10 that the received address is not the default one, i.e. the cloud whereto register IoT_D is a different one than the cloud the user is already registered. Therefore information providing a secure access to CS1 is obtained in point 7-10. The obtaining comprises prompting the user to provide the same login information, as in point 7-4, and receiving them. In another implementation the information received for user login in point 7-4 is used herein without separately prompting for it. Then the user logging is performed by messages 7-11 to CS1. In other words, a connection is established and user authenticated.

In the illustrated example it is assumed that the authentication (or login) succeeds, and therefore MD creates in point 7-12 at least two messages: one to CS1 and one to IoT_D. In the illustrated example, the remote support application is then turned off (closed) in point 7-15. However, it should be appreciated that other parameters in IoT_D may be set after message 7-13, and/or other information may be retrieved.

Message 7-13 is created and sent to IoT_D. MD, or more precisely the remote support application, sends in message

7-13 the received token information, together with the CS address, i.e. in the example the address of CS1, to IoT_D. It should be appreciated that creating message 7-13 includes retrieving the token, and other possible information, from message 7-9, and adding the CS address information received in point 7-10 to content part of message 7-13.

In response to receiving message 7-13, IoT_D stores in point 7-16, as token information at least the token and the address in the cloud to its secure memory.

A request to register IoT_D to CS1 is created in point 7-12 and sent in message 7-14 to CS1. Creating message 7-14 includes adding at least identification information of IoT_D received in message 7-3 and the token received in message 7-9.

Message 7-14 triggers registering in CS1 which, or its registration unit, stores in point 7-17 as token information at least the token associated with identification information of IoT_D, already in CS1 as trusted device. (If not indicated as a trusted device, it depends on the implementation whether the token and information of IoT_D will be stored or will not be stored.) Naturally other information, like validity time of the token, may be stored as part of the token information.

Since IoT_D and CS1 both have proper address information and share the same secret, the token generated in point 7-8, they can exchange information (messages 7-18) with each other.

In another example situation, if in point 7-10 the received CS address would have been the default CS address, i.e. CS2, instead of messages 7-11, MD would have sent one or more messages for user logging, which correspond to messages 7-11, to CS2 to inform that the token generated in point 7-8 should be stored with corresponding token information. If the identification information of IoT_D is not sent in message 7-7, it will be sent in a message for user logging. Naturally the identification information of IoT_D may be sent in both messages.

In a further example situation, if the register request is actually performed because of resetting the token information, CS1 (and naturally CS2), may be configured to replace an older token associated with the identification information of IoT_D in its memory with the newly generated token, thereby disabling the use of older token.

In FIG. 7, messages between IoT_D and MD (illustrated with dashed lines) may be sent using a short range wireless connection, examples of which are given above with FIG. 1. Messages sent to and from cloud services, i.e. messages between MD and CS1/CS2, depicted with unbroken lines, and messages between IoT_D and CS2, depicted with dot-and-dash lines, may be sent over one or more different and/or the same networks, wireless or wired, or their combination. For example, messages between MD and CS1/CS2, depicted with unbroken lines, may use a high bandwidth channel provided by a cellular communication system, and messages between IoT_D and CS2, depicted with dot-and-dash lines may use a low bandwidth channel provided by another or the same cellular communication system and/or narrowband channel for Internet of Things.

In sum, to provide an industrial automation device with a token to be used as authentication information in information exchange between a first cloud service and the industrial automation device, a mobile device is connected to the industrial automation device and to a cloud service that is the first cloud service or a second cloud service. After authenticating the user of the mobile device to the cloud service, a token is generated by the cloud service to the first cloud service, and forwarded via the mobile device to the industrial automation device. If the cloud service that generated the token is the second cloud service, the token is forwarded via the mobile device, after the mobile has been authenticated in the first cloud service, to the first cloud service. Thereafter, immediately or after some time, which may be a long time, the industrial automation device and the first cloud service may communicate directly with each other using the token for authentication, and thereby for information exchange. In other words, a user of a mobile device is authenticated in a cloud service, and after that the mobile device is used to request and convey a token for an industrial automation device, which token will be used for authentication purposes in information exchange between the industrial automation device and a cloud service.

FIG. 8 illustrates an example of information exchange when IoT_D has been configured at least with a token, token1, to CS1, and with a token, token2, to CS2. In the illustrated example, IoT_D is set up to connect to CS1 to send process or device usage specific data to CS1, and to connect to CS2 to receive updates to firewall, make automatic backups of parameters and settings and send condition monitoring data for predictive maintenance analysis, for example. Applying the procedure with an industrial automation device having plurality of tokens for plurality of cloud services is a straightforward solution to the one skilled in the art.

Referring to FIG. 8, when IoT_D, or its cloud connection unit, for example, detects in point 8-1 that there is information (specific data) to be sent to CS1, a token associated with CS1, i.e. token1, and the address to be used with CS1 are obtained in point 8-1, and the information is sent in message 8-2, using token1 to establish the connection and authenticate IoT_D in CS1.

When message 8-2 is received, CS1 detects in point 8-3 that the token, token1 is a valid one, and therefore the received information (specific data) is stored in point 8-3.

When CS2 detects in point 8-4 that there are updates for parameter values, for example, to be sent to IoT_D, a token associated with IoT_D, i.e. token2, and the address to be used with IoT_D are obtained in point 8-4, and the updates are sent in message 8-5, using token2 to establish the connection and authenticate CS2 in IoT_D.

When message 8-5 is received, IoT_D detects in point 8-6 that the token, token2 is a valid one and also valid for set ups, and therefore parameters are updated in point 8-6 according to the values received in messages 8-5. In addition, the connection is used to exchange also other information (messages 8-7).

Although the connections between IoT_D and CS1 and between IoT_D and CS2 in the above examples are illustrated as short time connections, and happening at different time, the connections may exist simultaneously, and/or exist a long time.

As is evident from the above, industrial automation devices may be provided with a token on a fly, for example, during set up. Hence, there is no need to provide the industrial automation device (or the panel) with the token as a hardcoded token when the industrial automation device (or to the panel) is manufactured. Neither the industrial automation device needs to be provided with a user interface via which the token could be inputted manually. Further advantage is that if a man-in-the-middle succeeds to figure out the content of the token, the token may be made invalid and a new token issued in a very prompt and secure way.

Thanks to prompting the user to select and input the cloud address, and sending it as part of token information to the industrial automation device, it is easy to configure the industrial automation device to communicate with one or more wanted clouds. Further, there is no need to configure the cloud address during manufacturing to the industrial automation device (or to the panel) as a hardcoded address.

As can be seen from the above, the provisioning of the token and use of the token are separate processes, the only link being that the token has to be provisioned before it can be used once or multiple times. In the token provisioning, the mobile device obtains the token on behalf of the industrial automation device, if authentication of the user of the mobile device succeeds. However, the use of the token is not linked to the user of the mobile device and his/her authentication information, the user and the mobile device are not part of the use process of the token. In other words, when the token is used for authentication between the industrial automation device and the cloud service, the mobile device is not involved, and whether the user of the mobile device is authenticated or not, or signed in or not, at the time the token is used, is not checked. This means that a possible federated identity management of the user can be utilized only in the provisioning, but it cannot be utilized for authentication between the industrial automation device and the cloud service.

The steps, points, messages (i.e. information exchange) and related functions described above in FIGS. 2 to 8 are in no absolute chronological order, and some of the steps/ points/information exchange may be performed simultaneously or in an order differing from the given one. Other functions can also be executed between the steps/points or within the steps/points, and other information may be sent. Some of the steps/points/information exchange or part of the steps/points/information exchange can also be left out or replaced by a corresponding step/point/information exchange or part of the step/point/information exchange.

The techniques and methods described herein may be implemented by various means so that a device/an apparatus configured to support token provisioning and its usage on at least partly on what is disclosed above with any of FIGS. 1 to 8, including implementing one or more functions/operations of a corresponding device described above with an embodiment/example, for example by means of any of FIGS. 2 to 8, comprises not only prior art means, but also means for implementing the one or more functions/operations of a corresponding functionality described with an embodiment/example, for example by means of any of FIGS. 2 to 8, and the device may comprise separate means for each separate function/operation, or means may be configured to perform two or more functions/operations. For example, one or more of the means and/or the remote registering unit and/or the remote tool unit and/or the cloud connection unit and/or the token generation unit and/or the token verification unit described above may be implemented in hardware (one or more devices), firmware (one or more devices), software (one or more modules), or combinations thereof. For a hardware implementation, the device(s) or apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 2 to 8, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 9:
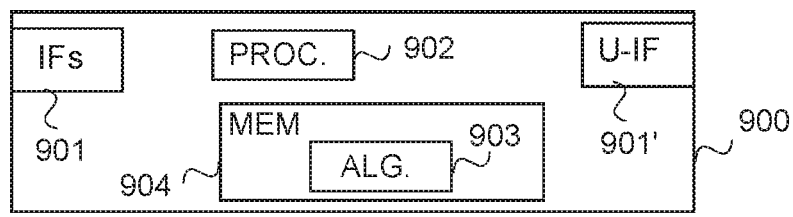
FIGS. 9 to 11 are schematic block diagrams.

FIG. 9 provides an apparatus (device) according to some embodiments of the invention. FIG. 9 illustrates an apparatus configured to carry out the functions described above in connection with the mobile device. Each apparatus 900 may comprise one or more communication control circuitry, such as at least one processor 902, and at least one memory 904, including one or more algorithms 903, such as a computer program code (software) wherein the at least one memory and the computer program code (software) are configured, with the at least one processor, to cause the apparatus to carry out any one of the exemplified functionalities of the mobile device. The apparatus may further comprise different communication interfaces 901 and one or more user interfaces 901'.

Figure 10:
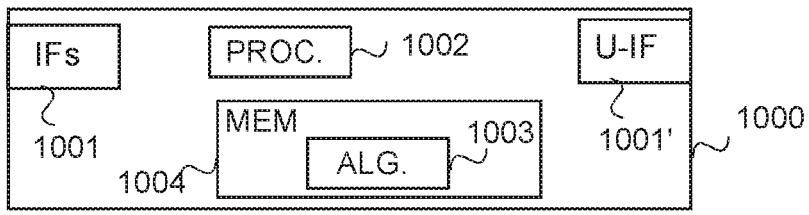

FIG. 10 provides an apparatus (device) according to some embodiments of the invention. FIG. 10 illustrates an apparatus configured to carry out the functions described above in connection with the cloud or cloud service. Each apparatus 1000 may comprise one or more communication control circuitry, such as at least one processor 1002, and at least one memory 1004, including one or more algorithms 1003, such as a computer program code (software) wherein the at least one memory and the computer program code (software) are configured, with the at least one processor, to cause the apparatus to carry out any one of the exemplified functionalities of the cloud (cloud service). The apparatus may further comprise different communication interfaces 1001 and one or more user interfaces 1001'.

Figure 11:
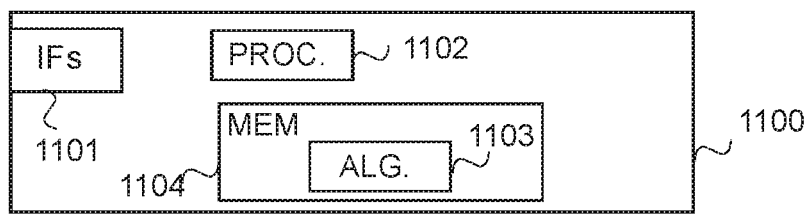

FIG. 11 provides an apparatus (device) according to some embodiments of the invention. FIG. 11 illustrates an apparatus configured to carry out the functions described above in connection with the industrial automation device. Each apparatus 1100 may comprise one or more communication control circuitry, such as at least one processor 1102, and at least one memory 1104, including one or more algorithms 1103, such as a computer program code (software) wherein the at least one memory and the computer program code (software) are configured, with the at least one processor, to cause the apparatus to carry out any one of the exemplified functionalities of the industrial automation device. The apparatus may further comprise different communication interfaces 1101. Although not illustrated in FIG. 11, the apparatus may comprise also one or more user interfaces 1101'.

Referring to FIGS. 9, 10 and 11, at least one of the communication control circuitries in the apparatus 900, 1000, 1100 is configured to provide the remote registering unit and/or the remote tool unit and/or the cloud connection unit and/or the token generation unit and/or the token verification unit, correspondingly, or any corresponding sub-unit, and to carry out functionalities, described above by means of any of FIGS. 2 to 8, by one or more circuitries.

The memory 904, 1004, 1104 or part of it may be implemented using any suitable data storage technology, such as semiconductor based memory devices, flash memory, magnetic memory devices and systems, optical memory devices and systems, fixed memory and removable memory.

The one or more communication interfaces 901, 1001, 1101 may comprise hardware and/or software for realizing communication connectivity according to one or more communication protocols. The communication interface may provide the apparatus with communication capabilities to communicate over a local connection and/or local connections and/or in a cellular communication system and/or in a fixed network, and enable communication between different apparatuses. The communication interface 901, 1001, 1101 may comprise standard well-known components.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a micro-processor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a user apparatus or a similar integrated circuit in a device.

In an embodiment, the at least one processor, the memory, and the computer program code form processing means or comprises one or more computer program code portions for carrying out one or more operations according to any one of the embodiments of FIGS. 2 to 8 or operations thereof.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method, comprising performing one of a first functionality, a second functionality, a third functionality and a fourth functionality, wherein the first functionality comprises: providing a first cloud service for industrial automation devices; receiving, at the first cloud service in a first cloud, from a mobile device, a request to establish a remote support session; authenticating a user of a remote support application running in the mobile device at the first cloud service; establishing, after successful authentication of the user, the remote support session between the mobile device and the first cloud service; generating, in response to receiving in the remote session a request for a token for an industrial automation device and industrial automation device information of the industrial automation device, a token to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device and the second cloud service is a remote service provided by a second cloud for industrial automation devices; and causing sending at least the token to the mobile device;

the second functionality comprises: providing a second cloud service; authenticating the user of the mobile device at the second cloud service; storing, in response to receiving from the mobile device, after successful authentication of the user of the mobile device, a token for an industrial automation device and industrial automation device information of the industrial automation device, the token received with the industrial automation device information received to the second cloud service; authenticating, using the token as authentication information, the industrial automation device with the second cloud service; and causing communicating, after a successful authentication of the industrial automation device, with the industrial automation device, wherein the communicating comprises at least one of sending data from the industrial automation device to the second cloud service, or receiving data in the industrial automation device from the second cloud service, or acquiring, by the second cloud service, data from the industrial automation device, wherein said data is not owned by the user of the mobile device;

the third functionality comprises: establishing a connection to the industrial automation device; retrieving, using the connection, device information from the industrial automation device; running in the mobile device a remote support application for remote support of industrial automation devices; authenticating a user of apparatus with a first cloud service to establish a remote support session; establishing, after successful authentication of the user, the remote support session between the mobile device and the first cloud service; prompting, by the mobile device, while running the remote support application, the user of the mobile device to provide information on a cloud service for which a token for the industrial automation device is to be requested; causing sending, during the remote support session, the device information of the industrial automation device to the first cloud service with a request for a token for the industrial automation device for the second cloud service received as user input to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device; and causing forwarding, in response to receiving the token, the token and information on the second cloud service with which to use the token to the industrial automation device, the information comprising a cloud address of the second cloud service; and the fourth functionality comprises: causing establishing a connection with the mobile device; storing, in response to receiving, without requesting, over the connection from the mobile device, a token generated by the first cloud service and information on the second cloud service for the industrial automation device, the information comprising a cloud address of the second cloud service, the token and the cloud address of the second cloud service to the memory, which comprises one or more token-cloud address pairs; authenticating the industrial automation device with the second cloud service using the token as authentication information; and causing, after successful authentication, the apparatus to exchange information with the second cloud, wherein exchanging information comprises at least one of sending data from the industrial automation device to the cloud service, or receiving data in the industrial automation device from the cloud service, or acquiring, by the cloud service, data from the industrial automation device, wherein said data is not owned by the user of the mobile device.

2. The method of claim 1, wherein the fourth functionality further comprises:

receiving, by the industrial automation device, with the token and information on the cloud service, additional information indicating information for which the token is to be used; and selecting, by the industrial automation device, the token and cloud service to be used based on the information to be exchanged.

3. The method of claim 1, wherein the third functionality further comprises, authenticating, by the mobile device, a user of the mobile device with the second cloud service, while running the remote support application; and causing sending, by the mobile device, after successful authentication of the user, while running the remote support application, the token and the device information of the industrial automation device to the second cloud service.

4. A non-transitory computer readable medium comprising one of a first set of program instructions, a second set of program instructions, a third set of program instructions, and a fourth set of program instructions, wherein the first set of program instructions causes a computing apparatus to perform: receiving, at a first cloud service provided by the computing apparatus in a first cloud as a remote service for industrial automation devices, from a mobile device, a request to establish a remote support session; authenticating a user of a remote support application running in the mobile device at the first cloud service; establishing, after successful authentication of the user, the remote support session between the mobile device and the first cloud service; generating, in response to receiving from the mobile device, during the remote session, a request for a token for an industrial automation device and industrial automation device information of the industrial automation device, a token to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device and the second cloud service is a remote service provided by a second cloud for industrial automation devices; and causing sending at least the token to the mobile device;

the second set of program instructions causes the computing apparatus to perform: authenticating the user of the mobile device at the second cloud service provided by the computing apparatus; storing, in response to receiving from the mobile device, after successful authentication of the user of the mobile device, a token for an industrial automation device and industrial automation device information of the industrial automation device, the token received with the industrial automation device information received to the second cloud service; authenticating, using the token as authentication information, the industrial automation device with the second cloud service; and causing communicating, after a successful authentication of the industrial automation device, with the industrial automation device, wherein the communicating comprises at least one of sending data from the industrial automation device to the second cloud service, or receiving data in the industrial automation device from the second cloud service, or acquiring, by the second cloud service, data from the industrial automation device, wherein said data is not owned by the user of the mobile device;

the third set of program instructions causes a mobile computing device to perform: establishing a connection to the industrial automation device; retrieving, using the connection, device information from the industrial automation device; running in the mobile device a remote support application for remote support of industrial automation devices; authenticating a user of the mobile computing device with the first cloud service to establish a remote support session; establishing, after successful authentication of the user, the remote support session between the mobile device and the first cloud service; prompting, by the mobile device, while running the remote support application, the user of the mobile device to provide information on a cloud service for which a token for the industrial automation device is to be requested; causing sending, during the remote support session, the device information of the industrial automation device to the first cloud service with a request for a token for the second cloud service received as user input to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device; and causing forwarding, in response to receiving the token, the token and information on the second cloud service with which to use the token to the industrial automation device, the information comprising a cloud address of the second cloud service; and the fourth set of program instructions causes an industrial automation computing device to perform: causing establishing a connection with the mobile device; storing, in response to receiving, without requesting, over the connection from the mobile device, a token generated by the first cloud service and information on a second cloud service for the industrial automation device, the information comprising a cloud address of the second cloud service, the token and the cloud address of the second cloud service to a memory, which comprises one or more token-cloud address pairs; authenticating the industrial automation device with the second cloud service using the token as authentication information; and causing, after successful authentication, the industrial automation computing device to exchange information with the second cloud service, the exchanging information comprising at least one of sending data from the industrial automation device to the cloud service, or receiving data in the industrial automation device from the cloud service, or acquiring, by the cloud service, data from the industrial automation device, wherein said data is not owned by the user of the mobile device.

5. An apparatus comprising:
at least one processor; and
at least one memory including computer program code;
the at least one memory and computer program code configured to, with the at least one processor, cause the apparatus to perform one of a first functionality, a second functionality, a third functionality and a fourth functionality, wherein
the first functionality causes the apparatus to perform: providing a first cloud service for industrial automation devices; receiving, at the first cloud service provided by the computing apparatus in a first cloud, from a mobile device, a request to establish a remote support session; authenticating a user of a remote support application running in the mobile device at the first cloud service; establishing, after successful authentication of the user, the remote support session between the mobile device and the first cloud service; generating, in response to receiving in the remote session a request for a token for an industrial automation device and industrial automation device information of the industrial automation device, a token to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device and the second cloud service is a remote service provided by a second cloud for industrial automation devices; and causing sending at least the token to the mobile device;
the second functionality causes the apparatus to perform: providing a second cloud service; authenticating the user of the mobile device at the second cloud service; storing, in response to receiving from the mobile device, after successful authentication of the user of the mobile device, a token for an industrial automation device and industrial automation device information of the industrial automation device, the token received with the industrial automation device information received to the second cloud service; authenticating, using the token as authentication information, the industrial automation device with the second cloud service; and causing communicating, after a successful authentication of the industrial automation device, with the industrial automation device, wherein the communicating comprises at least one of sending data from the industrial automation device to the second cloud service, or receiving data in the industrial automation device from the second cloud service, or acquiring, by the second cloud service, data from the industrial automation device, wherein said data is not owned by the user of the mobile device;
the third set of program instructions causes the apparatus to perform: establishing a connection to the industrial automation device; retrieving, using the connection, device information from the industrial automation device; running in the mobile device a remote support application for remote support of industrial automation devices; authenticating a user of apparatus with a first cloud service to establish a remote support session; establishing, after successful authentication of the user, the remote support session between the mobile device and the first cloud service; prompting, by the mobile device, while running the remote support application, the user of the mobile device to provide information on a cloud service for which a token for the industrial automation device is to be requested; causing sending, during the remote support session, the device information of the industrial automation device to the first cloud service with a request for a token for the industrial automation device for the second cloud service received as user input to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device; and causing forwarding, in response to receiving the token, the token and information on the second cloud service with which to use the token to the industrial automation device, the information comprising a cloud address of the second cloud service; and
the fourth set of program instructions causes the computing apparatus to perform: causing establishing a connection with the mobile device; storing, in response to receiving, without requesting, over the connection from the mobile device, a token generated by the first cloud service and information on the second cloud service for the industrial automation device, the information comprising a cloud address of the second cloud service, the token and the cloud address of the second cloud service to the memory, which comprises one or more token-cloud address pairs; authenticating the industrial automation device with the second cloud service using the token as authentication information; and causing, after successful authentication, the apparatus to exchange information with the second cloud, wherein exchanging information comprises at least one of sending data from the industrial automation device to the cloud service, or receiving data in the industrial automation device from the cloud service, or acquiring, by the cloud service, data from the industrial automation device, wherein said data is not owned by the user of the mobile device.

6. A system comprising:
at least a first cloud comprising at least one first apparatus configured to provide a first cloud service;
at least a second cloud comprising at least one second apparatus configured to provide a second cloud service;

at least one mobile device; and at least one industrial site comprising at least one industrial automation device; wherein the first apparatus comprises at least one processor and at least one memory including computer program code; the at least one memory and computer program code configured to, with the at least one processor, cause the first apparatus at least to perform: authenticating, in response to receiving from the mobile device a request to establish a remote support session, a user of a remote support application running in the mobile device at the first cloud service, wherein the first cloud service is a remote service provided by the first cloud for industrial automation devices; establishing, after successful authentication of the user, the remote support session between the mobile device and the first cloud service; generating, in response to receiving from the mobile device, during the remote session, a request for a token for the industrial automation device and industrial automation device information of the industrial automation device, a token to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device and the second cloud service is a remote service provided by the second cloud for industrial automation devices; and causing sending at least the token to the mobile device;

the second apparatus comprises at least one processor and at least one memory including computer program code; the at least one memory and computer program code configured to, with the at least one processor, cause the second apparatus at least to perform: authenticating the user of the mobile device at the second cloud service; storing, in response to receiving from the mobile device, after successful authentication of the user of the mobile device, a token for an industrial automation device and industrial automation device information of the industrial automation device, the token received with the industrial automation device information received to the second cloud service; authenticating, using the token as authentication information, the industrial automation device with the second cloud service; and causing communicating, after a successful authentication of the industrial automation device, with the industrial automation device, wherein the communicating comprises at least one of sending data from the industrial automation device to the second cloud service, or receiving data in the industrial automation device from the second cloud service, or acquiring, by the second cloud service, data from the industrial automation device, wherein said data is not owned by the user of the mobile device;

the mobile device comprises at least one processor and at least one memory including computer program code; the at least one memory and computer program code configured to, with the at least one processor, cause the mobile device at least to perform: establishing a connection to the industrial automation device; retrieving, using the connection, device information from the industrial automation device; running in the mobile device a remote support application for remote support of industrial automation devices; authenticating the user of the mobile device with the first cloud service to establish a remote support session;

establishing, after successful authentication of the user, a remote support session between the mobile device and the first cloud service; prompting, by the mobile device, while running the remote support application, the user of the mobile device to provide information on a cloud service for which a token for the industrial automation device is to be requested; causing sending during the remote support session the device information to the first cloud service with a request for a token for the industrial automation device for the second cloud service received as user input; and forwarding, in response to receiving from the first cloud service a token to be used as authentication information required to send data from the industrial automation device to the second cloud service, or to receive data in the industrial automation device from the second cloud service, or to acquire, by the second cloud service, data from the industrial automation device, wherein said data is not owned by the user of the mobile device, the token and information on the second cloud service with which to use the token to the industrial automation device, the information comprising a cloud address of the second cloud service; and the industrial automation device comprises at least one processor and at least one memory including computer program code; the at least one memory and computer program code configured to, with the at least one processor, cause the industrial automation device at least to perform: establishing a connection with the mobile device; storing, in response to receiving, without requesting, over the connection from the mobile device, a token generated by the first cloud service for the second cloud service and information on the second cloud service, the information comprising a cloud address of the second cloud service, the token and the cloud address of the second cloud service to the memory, which comprises one or more token-cloud address pairs; authenticating the industrial automation device with the second cloud service using the token as authentication information; and exchanging, after successful authentication, information with the second cloud service, the exchanging information comprising at least one of sending data from the industrial automation device to the cloud service, or receiving data in the industrial automation device from the cloud service, or acquiring, by the cloud service, data from the industrial automation device, wherein said data is not owned by the user of the mobile device.

* * * * *